(12) United States Patent
Tu et al.

(10) Patent No.: US 11,636,683 B2
(45) Date of Patent: Apr. 25, 2023

(54) PRECISE OBJECT SEGMENTATION WITH MULTI-MODAL INPUT FOR REALTIME VIDEO APPLICATION

(71) Applicant: Black Sesame Technologies Inc., San Jose, CA (US)

(72) Inventors: Fangwen Tu, Singapore (SG); Bo Li, Singapore (SG)

(73) Assignee: Black Sesame Technologies Inc., San Jose, CA (US)

(*) Notice: Subject to any disclaimer, the term of this patent is extended or adjusted under 35 U.S.C. 154(b) by 0 days.

(21) Appl. No.: 17/474,774

(22) Filed: Sep. 14, 2021

(65) Prior Publication Data
US 2023/0083896 A1 Mar. 16, 2023

(51) Int. Cl.
*G06V 20/40* (2022.01)
*G06T 7/194* (2017.01)
*G06T 7/215* (2017.01)

(52) U.S. Cl.
CPC ............ *G06V 20/49* (2022.01); *G06T 7/194* (2017.01); *G06T 7/215* (2017.01); *G06V 20/46* (2022.01)

(58) Field of Classification Search
CPC ........ G06V 20/49; G06V 20/46; G06T 7/194; G06T 7/215
See application file for complete search history.

(56) References Cited

U.S. PATENT DOCUMENTS

| | | | |
|---|---|---|---|
| 7,224,852 B2 | 5/2007 | Lipton et al. | |
| 8,774,502 B2 | 7/2014 | Lee et al. | |
| 9,449,229 B1* | 9/2016 | Laska | G08B 13/19606 |
| 11,120,293 B1* | 9/2021 | Rosenzweig | G06T 7/246 |
| 11,334,751 B2* | 5/2022 | Winter | G06V 20/41 |
| 2007/0160289 A1* | 7/2007 | Lipton | G06V 10/28 382/173 |
| 2016/0037087 A1* | 2/2016 | Price | H04N 5/272 348/586 |
| 2018/0315199 A1* | 11/2018 | Socek | G06T 7/207 |
| 2019/0019031 A1* | 1/2019 | Yun | G06T 7/251 |
| 2021/0233248 A1* | 7/2021 | Li | G06T 5/004 |
| 2022/0138964 A1* | 5/2022 | Gintsburg | G06N 7/01 382/103 |

OTHER PUBLICATIONS

A Multimodal Scheme for Program Segmentation and Representation in Broadcast Video Streams—2008 (Year: 2008).*
Report of 2017 NSF Workshop on Multimedia Challenges, Opportunities and Research Roadmaps—2018 (Year: 2018).*
Methods and Challenges in Shot Boundary Detection: A Review—2018 (Year: 2018).*

* cited by examiner

*Primary Examiner* — Nizar N Sivji
(74) *Attorney, Agent, or Firm* — Timothy T. Wang; Ni, Wang & Massand, PLLC

(57) ABSTRACT

The present invention discloses a system for precise representation of object segmentation with multi-modal input for real-time video applications. The multi-modal segmentation system takes advantage of optical, temporal as well as spatial information to enhance the segmentation for AR and VR or other entrainment purpose with accurate details. The system can segment foreground objects such as human and salient objects within a video frame and allows locating object-of-interest for multiple-purposes.

15 Claims, 8 Drawing Sheets

PRECISE OBJECT SEGMENTATION WITH MULTI-MODAL INPUT FOR REALTIME VIDEO APPLICATION

FIELD OF INVENTION

The present invention relates to tools of segmenting a video for real-time video applications. More specifically, a multi-modal system for segmenting a foreground object such as human and salient objects within a multimedia and allows locating object-of-interest for multiple-purposes. More particularly, the present invention also relates to a method for segmenting the video frame for detecting object and tracking the video frame simultaneously.

BACKGROUND

With fast development of devices' computation power and SG fast communication technologies, the demands of video application such as virtual reality (AV and VR), online LIVE show, blossom recently. If the machine can help to indicate the salient objects or foreground precisely in the video, many applications can be applied.

With the improvements in image and video processing, a representation that is semantically more useful is required for a wide range of applications, such as object-based video coding, video indexing, retrieval and video summarization.

Robust detection of foreground, interesting or unusual events is an important precursor for many image and video applications, such as tracking, identification, and surveillance. Although, there is often no prior information available about the foreground object to be detected, in many situations the background scene is available in all frames of the video. Important factors that make foreground detection very challenging are like dynamic background, movement or camera motion due to vibration, wind, etc., requirement of real-time or quasi-real-time detection of video for most applications. These factors make detection of foreground or object very difficult. Background modeling for foreground detection is often used in different applications to model the background and then detect the moving objects in the scene like in video surveillance.

Video segmentation is a systematic task that aims to improve visual quality for better user experience. The aim of segmenting a video is to improve the visual experience of the user. Currently, video or image segmentation systems available fail to indicate salient objects or foreground precisely in the video or image. Hence, the video or image segmentation system fails to provide video frame segmentation with high-quality to the user. The video object-tracking task in its finest level. While the VOS task can be naturally decoupled into image semantic segmentation and video object tracking, significantly much more research effort has been made in segmentation than tracking.

However, existing image and video segmentation systems only use local information for segmentation of video or image. Among existing video or image segmentation systems, some video or image segmentation systems are based on camera configuration. In an example, static camera or fixed camera scenarios have high chance to segment a video or image while live shows, online teaching and the like. Now a day, to carry out a segmented video has become a challenging problem.

A U.S. Pat. No. 8,774,502 assigned to National Cheng Kung University describes a method for image and video segmentation using texture feature. The method for image and video segmentation using texture feature adopts combination of textual feature of an image signal and color feature of an image signal. Although, the present invention provides an image segmentation method for texture feature in order that the texture feature and color feature of an image signal combined, and an image signal can be segmented into plural texture color feature. However, the method described is inefficient and does not disclose any relation with the tracking of the video and image signals.

Another U.S. Pat. No. 7,224,852 assigned to Avigilon Fortress Corp discloses a video segmentation technique using statistical pixel modeling method for segmentation of video into foreground information and background information, based on statistical properties of the source video. Although, the method disclosed creates and updates statistical information pertaining to a characteristic of regions of the video and the labeling of those regions (i.e., as foreground or background) based on the statistical information. However, the method described for segmentation of video segments video into foreground information and background information performs rough segmentation without acquiring any semantic or temporal information involved in the determination system. Thus, we proposed methods that can utilize and analyze the additional information to benefit the outcome.

The prior an described above only maintains a monotonous system that has limited flexibility and involves a restricted type of operations tasked to segment videos and images. Although many applications acquires only local information, which is a learned based approach, instead of conventional methods to achieve better performance on these demanding technologies, there hasn't been any invention in which the system is able to segment videos and images intelligently, adaptively and flexibly.

Additionally, existing system also does not properly take into account user experience. In other words, there is not a single paradigm in video segmentation that provides seamless user experience to guarantee high quality foreground segmentation.

Therefore, to overcome the shortcomings of the prior-arts, there is a need to provide a video segmentation system that intelligently and adaptively segments the video using artificial intelligence. Additionally, it would be desirable to provide a video segmentation system that focus on segmenting the video based on acquisition of global information by processing the video to enhance the quality of the video. Thus, there is a need to provide a multimodal system that provides better visual effects and seamless experience to a user based on the global information acquired by the video acquired by the multimedia unit.

In addition, among these applications, some specific camera configurations such as fixed camera scenarios have high chance to appear, for example doing live show, interview or even online teaching. These specific cases usually can provide additional information than the normal case that can be employed to upgrade the segmentation quality.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need to provide a multimodal system for segmenting a video that provides better visual effects and seamless experience to a user based on the global information acquired by the video segmentation system.

SUMMARY OF THE INVENTION

In accordance with the present invention, the disadvantages and limitations of the prior art are substantially avoided by providing a method for segmenting a multimedia with high quality by a multi-modal system. The multi-modal system is a user-friendly system that provides seamless experience to the user.

The present invention discloses a multi-modal system for segmenting a video and tracking an object such as human, salient objects within the video. The multi-modal system includes a cascade refinement module, a background complement module and a processing module. The cascade refinement module optimizes the video by sensing motion in the video. The cascade refinement module includes a multimedia unit for recording the video. Further, the cascade refinement module includes an input unit to receive the video from a multimedia unit. Further, the cascade refinement module includes a refinement unit for refining the video by concatenating additional information to the video for generating an optimized output.

Further, the multi-modal system includes the background complement module for processing the optimized result. Further, the background complement module includes a capturing unit for capturing frames associated with the optimized output. In addition, the capturing unit synthesis background information associated with the optimized unit to generate an output. Further, the background complement module includes a masking unit for producing multiple masks based on the output generated by the capturing unit. In addition, the multi-modal system includes a processing module for processing the multiple masks. In addition, the processing module receives the multiple masks from the background module. In addition, the processing module processes the multiple masks to produce a segmented video.

In one aspect of the present invention, the cascade refinement module seamless user experience. In another aspect of the present invention, the cascade refinement module provides high quality foreground segmentation. In yet another aspect of the present invention, the background complement module associated with the multi-modal system further includes a notification unit for sending a notification to the multimedia unit to capture the one or more additional information associated with the video. In another aspect of the present invention, the multimedia unit is a digital camera, mobile phone, camcorder, tablet, webcam, laptop and iPad.

In another aspect of the present invention, the one or more additional information is backgrounds, foreground humans, consistent frames, pixels, motion maps and semantic boundaries. In another aspect of the present invention, the one or more masks produced by the masking unit are artificial intelligence based masks. In another aspect of the present invention, the processing module associated with the multi-modal system includes an information-processing unit. In addition, the processing unit extracts one or more features associated with the one or more masks that are generated by the masking unit using an extractor. In another aspect of the present invention, the extractor is CNN feature extractor.

In another aspect of the present invention, the processing module associated with the multi-modal system includes a selection unit. In addition, the selection unit selects one or more dominant and effective features among the one or more information extracted from the one or more masks. In another aspect of the present invention, the information selection unit learns to select the one or more dominant and effective features automatically.

In another aspect of the present invention, the processing module associated with the multi-modal system includes a combination unit. In addition, the combination unit combines the one or more dominant and effective features among the one or more information extracted from the one or more masks to produce an outcome. The outcome is a segmented video with an improved foreground.

The method for segmenting a video with high quality by a multimodal system. The method includes a step is to initiate a recording of the multimedia using a multimedia unit. Further, the method includes a step to detect motion of the multimedia unit by a detection unit. Further, the method includes sending notification on the multimedia unit related to capture a background region. Further, the method includes capturing the background region by a capturing unit.

In addition, the method includes activating to start shooting of the multimedia. The method includes producing multiple masks based on the background region by a masking unit. The method includes updating the background region to ensure up-to-date status of the multimedia. The method further includes processing the one or more masks to generate a segmented video.

In alternative embodiment of the present invention, the method includes analyzing movement of the multimedia unit to process normal recording. Furthermore, the multimedia segmented based on detection of motion of the multimedia unit by the detection unit, capturing of the background region of the multimedia and the one or more masks produced by the mask production unit.

A primary objective of the present invention is to provide a system and method for segmenting multimedia with high-quality performance.

Another objective of the present invention is to provide a multi modal system for segmenting a video that is intelligent and self-learning.

Yet another objective of the present invention is to provide the multi-modal system that is user friendly.

Another objective of the present invention is to provide the multi modal system that is adaptive and flexible.

Yet another objective of the present invention is to provide the multi modal system that enables a seamless switch between normal mode and refinement mode.

Further objects of the invention will appear as the description proceeds.

In one aspect of the present invention, the method further includes detection of motion of the multimedia unit by the detection unit. In addition, detection unit detects motion of the multimedia unit. Further, the multimedia unit starts normal recording. In addition, the method includes starting of the normal recording of the multimedia by the multimedia unit.

In another aspect of the present invention, the method further includes analyzing movement of the multimedia unit by the analyzing unit. In addition, the analyzing unit analyzes movement of the multimedia unit. Further, the method includes another step. Another step is to produce the multiple masks based on the background details. In addition, the multiple masks are produced using the mask production unit. Furthermore, the method includes another step. Another step is to update background details to ensure up-to-date status of the background details.

In another aspect of the present invention, the multi-modal system that provides dense and precise representation of one or more foreground objects. In yet another aspect of the present invention, the one or more foreground objects are humans and salient objects. In another aspect of the present invention, the multi-modal system based on Artificial intelligence. In another aspect of the present invention, the multimedia is a video, an audio and an image. In yet another aspect of the present invention, the multimedia unit is a digital camera, mobile phone, camcorder, tablet, webcam, laptop and iPad. In another aspect of the present invention, the detection unit is accelerometer sensor, gyroscope sensor and GPS.

The method for segmenting a multimedia with high quality by a multimodal system. The method includes a step is to initiate a recording of the multimedia using a multimedia unit. Further, the method includes a step to detect motion of the multimedia unit by a detection unit. Further, the method includes sending notification on the multimedia unit related to capture a background region. Further, the method includes activating to start shooting of the multimedia Further, the method includes capturing the background region by a capturing unit. Further, the method includes synthesis of the background region by the background synthesis unit. Further, the method includes producing multiple masks based on the background region by a masking unit. Further, the method includes updating the background region to ensure up-to-date status of the multimedia. The method further includes extracting multiple features associated with the one or more masks. Further, the method includes selecting multiple dominant features from the multiple features associated with the one or more masks. Further, the method includes combining the multiple features to generate a segmented multimedia.

In alternative embodiment of the present invention, the method includes analyzing movement of the multimedia unit to process normal recording. Furthermore, the multimedia segmented based on detection of motion of the multimedia unit by the detection unit, capturing of the background region of the multimedia and the one or more masks produced by the mask production unit.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a pan of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE DRAWINGS

Figure 1A:
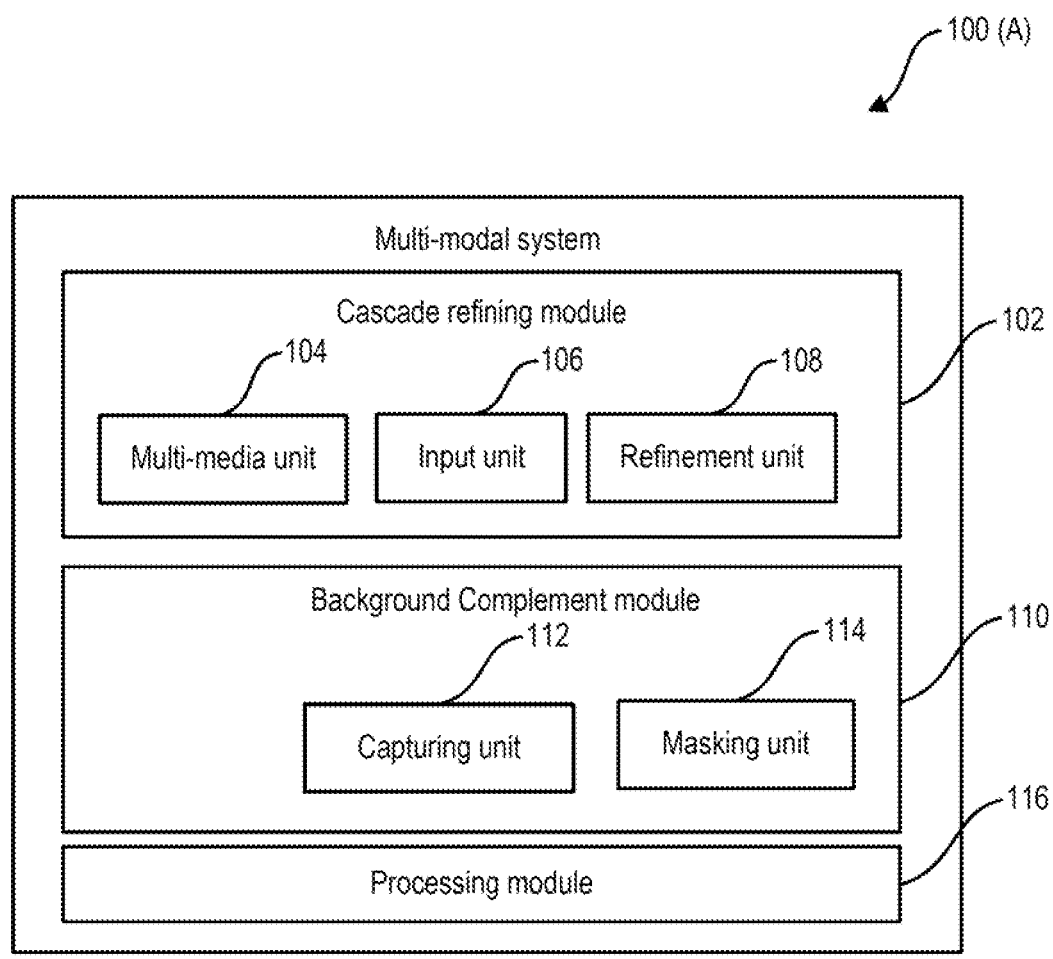
FIG. 1(A) illustrates a multi-modal system for segmenting a video in accordance with the present invention.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

The present invention provides a multi-modal system for segmenting a video and tracking an object such as human, salient objects within the video. The multi-modal system includes a cascade refinement module, a background complement module and a processing module. The cascade refinement module optimizes the video by sensing motion in the video.

Further, the multi-modal system includes the background complement module for processing the optimized output. Further, the background complement module includes a capturing unit for capturing frames associated with the optimized output. In addition, the background synthesis unit synthesizes the background region associated with the optimized output to generate a video output. Further, the background complement module includes a masking unit for producing multiple masks based on the output generated by the capturing unit. In addition, the multi-modal system includes a processing module for processing the multiple masks to produce a segmented video.

The multi-modal system includes an analyzing unit. The analyzing unit associated with the Multi-modal system analyzes movement of the multimedia unit. In an example, the analyzing unit detects no movement of the multimedia unit. Further, the analyzing unit processes to normal recording. In an embodiment, the normal recording includes information. The information may be video frames.

Hence, the Multi-modal system segments the video frame based on detection of motion of the multimedia unit by the detection unit, capturing of the frame and synthesis background details of the video frame and the multiple masks produced by the mask production unit.

The Multi-modal system further monitors motion of the multimedia unit. The detection unit associated with the video segmentation system monitors motion of the multimedia unit. In another embodiment, the detection unit, monitors severe motion of the multimedia unit. Further, activates a refinement node. In addition, the multimedia unit captures the video frame in the refinement node. Further, the Multi-modal system terminates background capturing.

Furthermore, the Multi-modal system reverts to normal recording node of the video frame. The normal recording node of the normal recording mode processes information for generating the multiple masks. The information processed is the video frame. The refinement node of the refinement mode produces the multiple masks based on output generated by output of the normal recording and the additional information for quality enhancement. In an example, the multiple additional information may not be limited to background and motion of the multimedia unit.

FIG. 1(A) illustrates a multi-modal system (100A) for tracking object in a video and segmenting the video. The multi-modal system (100A) segments the video into multiple segments. The multi-modal system (100A) represents dense and precise representation of multiple foreground objects within the video. In an example, the multiple foreground objects include humans and salient objects etc. The multi-modal system (100A) works on principal of artificial intelligence. The multi-modal system (100A) provides seamless user experience.

The multi-modal system (100A) for segmenting the video includes a cascade refinement module (102) for refining the inputted video, by calculating or looking for motion within the video frame. The cascade refinement module (102) includes a multimedia unit (104) for recording the video.

The cascade refinement module (102) includes an input unit (106) for inputting the video into a refinement unit (108) if no motion detected within the multimedia unit (102). The refinement module (106) optimizes the video by adding additional information for refining the video to generate an optimized video output. In an example, the multiple additional information associated with the video source may not be limited to backgrounds, foreground humans, consistent frames, pixels, motion maps and semantic boundaries.

Further, the multimodal system (100A) includes a background complement module (110) for adding background in the optimized video output from the refinement unit (106). Further, the background complement module (110) includes a notification unit sends notification to the multimedia unit to capture a background region or details associated with the video. Further, the background complement module (110) includes a capturing unit (112) for capturing frames associated with the optimized result to generate an output video and starts with normal shooting.

Further, the background complement module (108) includes a masking unit (114) to produce multiple masks based on the output generated by the capturing unit (112) of the background complement module (108) to produce an output result AI masked Video. Further, the multi-modal system (100) includes a processing module (116) to process the one or masks associated with the video output to produce a segmented video.

Figure 1B:
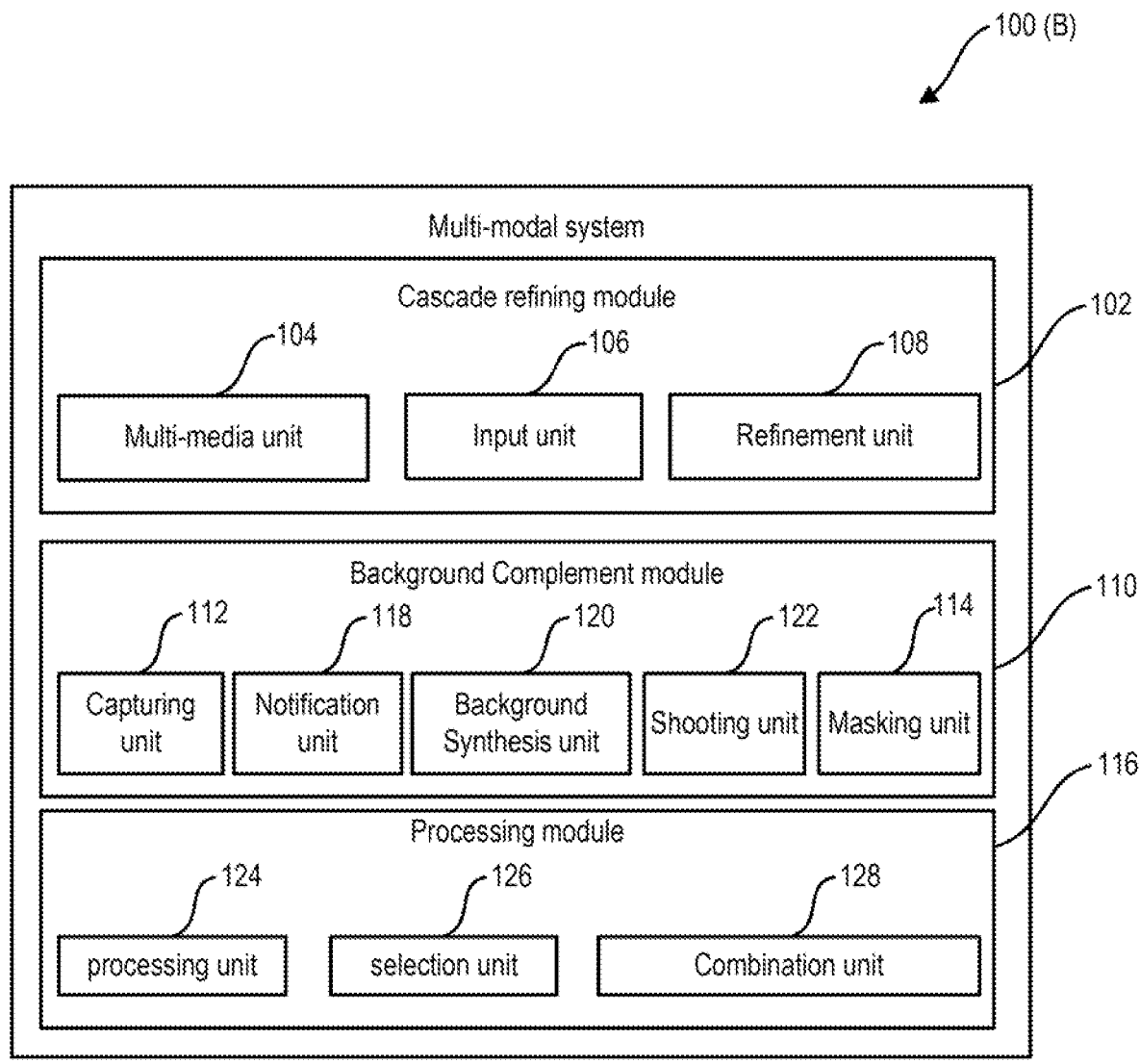
FIG. 1(B) illustrates a multi-modal system for segmenting a multimedia in accordance with the present invention.

FIG. 1(B) illustrates a multi-modal system (100B) for tracking a foreground object in a multimedia and segmenting the multimedia. The multi-modal system (100) segments the video into multiple segments. In an example, the multiple foreground objects include humans and salient objects etc. The multi-modal system (100) works on principal of artificial intelligence. The multi-modal system (100) provides seamless user experience. The multi-modal system 202 is a user-friendly system.

The multi-modal system (100) for segmenting the video includes a cascade refinement module (102) for refining the inputted video, by calculating or looking for motion within the multimedia. The cascade refinement module (102) includes a multimedia unit (104) for recording the multimedia.

The cascade refinement module (102) includes an input unit (106) for inputting the multimedia into a refinement unit (108) if no motion detected within the multimedia unit (102). The refinement module (106) optimizes the multimedia by adding additional information for refining the video to generate an optimized multimedia output. In an example, the multiple additional information associated with the video source may not be limited to backgrounds, foreground humans, consistent frames, pixels, motion maps and semantic boundaries.

Further, the multimodal system (100) includes a background complement module (110) for adding background in the optimized video output from the refinement unit (106). Further, the background complement module (110) includes a notification unit (118) sends notification to the multimedia unit to capture a background region or details associated with the video. Further, the shooting unit (122) activated to start shooting of the multimedia depending upon the notification.

In one example, the notification pop up is refusal for capturing the background. The shooting unit (122) activated to start shooting of the multimedia. Further, the capturing unit (112) starts capturing the background region associated with the optimized multimedia output generate an output video. Further, the background synthesis unit (120) starts synthesis of the background region.

In another example, the notification allows or permits the capturing of the background. The capturing unit (112) starts capturing the background region associated with the optimized multimedia output generate an output video. Further, the shooting unit (122) activated to start shooting of the multimedia after capturing of the background details or region.

Further, the background complement module (108) includes a masking unit (114) to produce multiple masks based on the output generated by the capturing unit (112) of the background complement module (108) to produce an output result AI masked Video. Further, the multi-modal system (100) includes a processing module (116) to process the one or masks associated with the video output to produce a segmented video.

The processing module (116) further processing unit (124) for extracting multiple features associated with the absolute output by using an extractor. In an example, the extractor utilized by the information-processing unit (118) is CNN feature extractor.

Further, the processing module (116) includes the selection unit (126) for selecting multiple dominant and effective features from the multiple features. Further, the processing module (116) includes the combination unit (128) for concatenating the multiple dominant and effective features to produce an outcome. The outcome is the segmented multimedia providing seamless user experience to a user.

Figure 2:
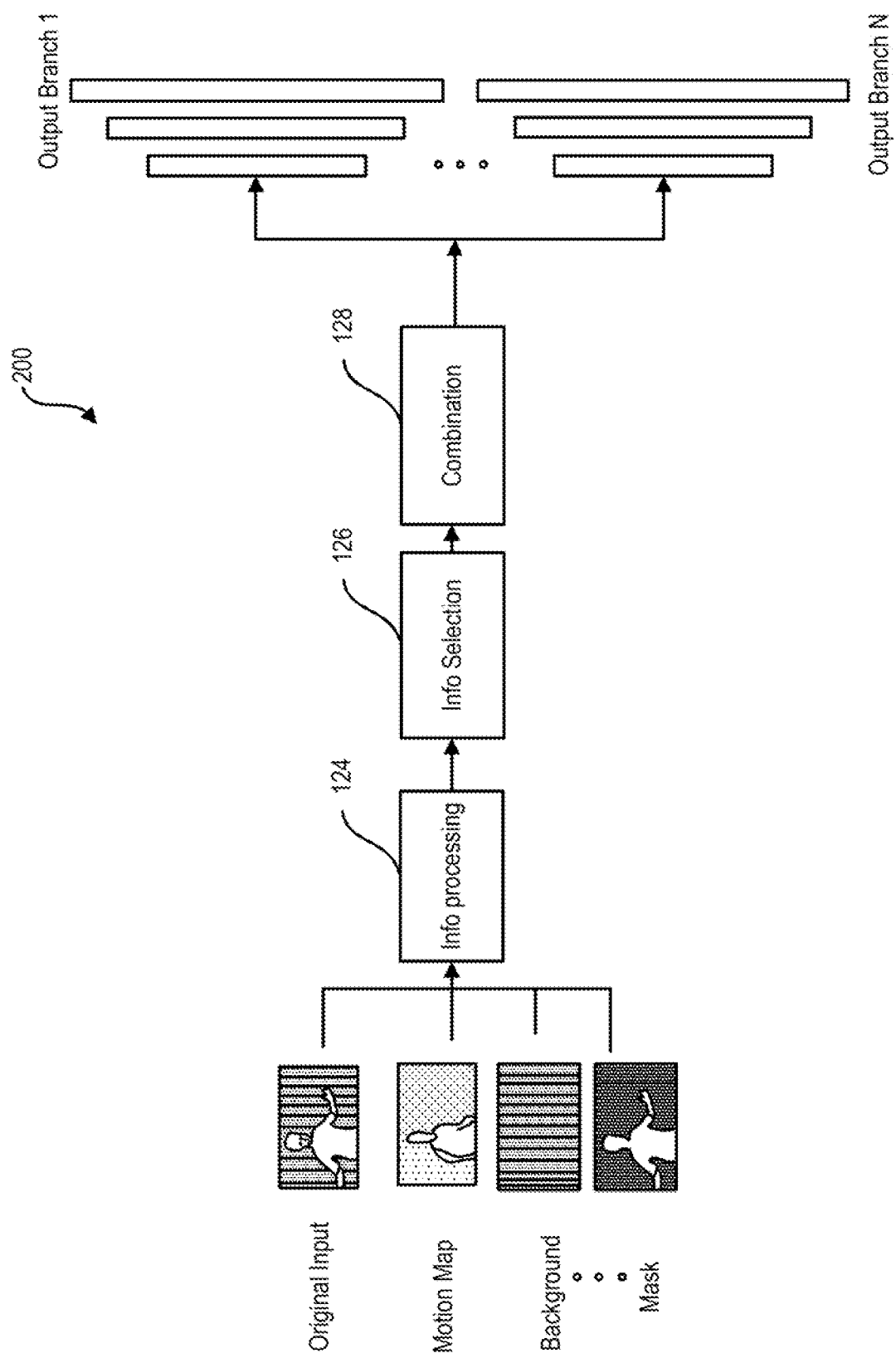
FIG. 2 illustrates a schematic diagram of the multi-modal system for segmenting a video frame in accordance with the present invention.

FIG. 2 illustrates a schematic diagram of a multi-modal system (200) for segmenting a video. The multi-modal system (200) for segmenting a video frame into multiple processed segments for enhancing visual experience for a user and video quality. The multi-modal system (200) includes a cascade refinement module (102), a background complement module (108) and a processing module (116).

The multi-modal system (200) provides seamless user experience. The multi-modal system (200) offers a dense and precise representation of multiple objects. The multiple objects may not be limited to humans and salient objects. In an embodiment, the multi-modal system (200) performs segmentation of multiple specific components. The multiple specific components of interest may not be limited to hand, hair and other accessories.

The multi-modal system (200) provides improved and enhanced user experience. In an embodiment, the multi-modal system (200) designed to provide a smooth switch between normal mode and refinement mode. In another embodiment, the multi-modal system (200) is a self-learning system. In addition, the multi-modal system (200) makes model maps and take it as auxiliary input to enhance segmentation of the video source. In another embodiment, the multi-modal system (200) designed to learn background information incrementally. In addition, the multi-modal system (200) utilizes the background information for performing segmentation more accurately.

In an embodiment, the multi-modal system (200) deployed on the multimedia unit. In an example, the multimedia unit may not be limited to a digital camera, mobile phone, camcorder, tablet, webcam, laptop and iPad. Further, the multi-modal system (200) includes the cascade refinement module (102) for optimizing the video source. The multimedia unit captures the video frames.

The cascade refinement module (102) associated with the multi-modal system (100) receives the video frames from the multimedia unit. Further, the cascade refinement module (102) includes an input unit and a refinement unit. In addition, the input unit of the cascade refinement module associated with the multi-modal system (200) receives the video source from the multimedia unit.

Further, the input unit of the cascade refinement module associated with the multi-modal system (200) provides the video source to the refinement unit. Further, the refinement unit concatenates additional information to the video source to generate an optimized output. In an example, the additional information is background, foreground humans, consistent frames, pixels, motion maps, semantic boundaries and the like.

The cascade refinement module associated with the multi-modal system (200) provides seamless user experience. In general, the user does not need to face any interruption. In addition, the cascade refinement module associated with the multi-modal system (200) provides high quality foreground segmentation.

Further, the multi-modal system (200) includes the background complement module. In addition, the background complement module includes a notification unit, a capturing unit and a masking unit. The background complement module associated with the multi-modal system (200) processes the optimized result. The background complement module receives the optimized output from the cascade refinement module.

The background complement module includes the notification unit that sends notification to the multimedia unit to capture the additional information associated with the video source. In an example, the multiple additional information may not be limited to backgrounds, foreground humans, consistent frames, pixels, motion maps and semantic boundaries.

Further, the background complement module includes the capturing unit. The capturing unit of the background complement module captures frames associated with the optimized result. The capturing unit synthesizes background information associated with the optimized result to generate an output.

Further, the background complement module includes the masking unit. The masking unit of the background complement module associated with the multi-modal system (200) processes the output generated by the capturing unit. The masking unit of the background complement module produces multiple masks based on the output generated by the capturing unit of the background complement module associated with the multi-modal system (200). The multiple masks generated by the masking unit of the background complement module associated with the multi-modal system (200) are artificial intelligent based masks.

Further, the multi-modal system (200) includes the processing module (116) for processing video frames and outputting the video. In addition, the processing module (116) associated with the multi-modal system (100) includes a processing unit (124), an selecting unit (126) and a combination unit (128). In addition, the processing module (116) processes the multiple masks to produce a segmented video. The processing module (116) associated with the multi-modal system (100) receives the multiple masks from the background complement module.

The processing module (116) further processing unit (124) for extracting multiple features associated with the absolute output by using an extractor. In an example, the extractor utilized by the information-processing unit (118) is CNN feature extractor.

Further, the processing module (116) includes the selection unit (126) for selecting multiple dominant and effective features from the multiple features. Further, the processing module (116) includes the combination unit (128) for concatenating the multiple dominant and effective features to produce a segmented multimedia providing seamless user experience to a user.

Figure 3:
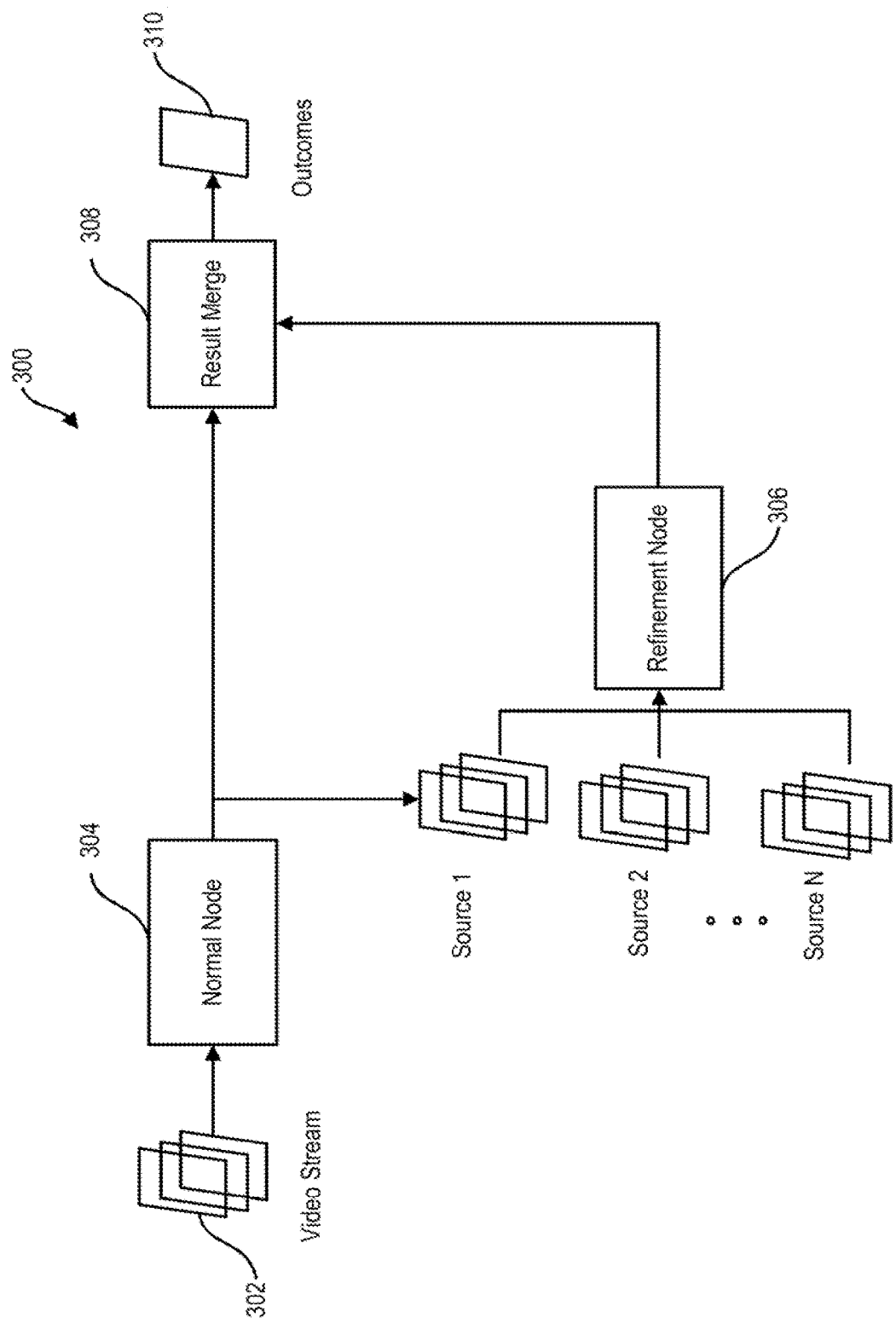
FIG. 3 illustrates a cascade refinement module within the multi-modal system in accordance with the present invention.

FIG. 3 illustrates a layout of a cascade refinement module (102). The cascade system (102) represents a hierarchical layout of a segmentation system. In an embodiment, the layout of the cascade system (102) represents a difference between a normal segmentation node of a normal mode and a refined segmentation node of a refinement node. In addition, the normal segmentation node of the normal node includes an output. In addition, the refined segmentation node of the refinement node includes another output.

In one embodiment of the present invention, the cascade refinement module (102) further includes a detection unit (302) to detect motion of the multimedia unit to produce the outcome before the refinement unit (106). In an embodiment, the detection unit (302) detects motion of the multimedia unit. In addition, the multimedia unit activates the normal segmentation node of the normal mode. The cascade refinement module (102) processes the video stream in the normal segmentation node of the normal mode to process the output.

In alternative embodiment of the present invention, the detection unit (302) associated with the cascade refinement module (102) detects fixed configuration. In addition, the multimedia unit activates the refined segmentation node of the refinement mode. In addition, the cascade refinement module (102) processes the video stream initially in the normal segmentation node of the normal mode then processes the video stream in the refined segmentation node of the refinement mode post to the normal mode to process another output.

Further, the cascade refinement module (102) combines the output associated with the normal segmentation node of the normal mode and another output associated with the refined segmentation node of the refinement mode to generate the outcome In an embodiment, the normal segmentation node of the normal mode acquires less information to generate multiple masks. In an example, the less information may be video frames only. In another embodiment, the refined segmentation node of the refinement mode acquires the information to produce the multiple masks. In an example, the information includes the output of the normal segmentation node of the normal mode, background information, motion information, pixel information and the like. The refined segmentation node of the refinement mode acquires the information for quality enhancement.

Figure 4A:
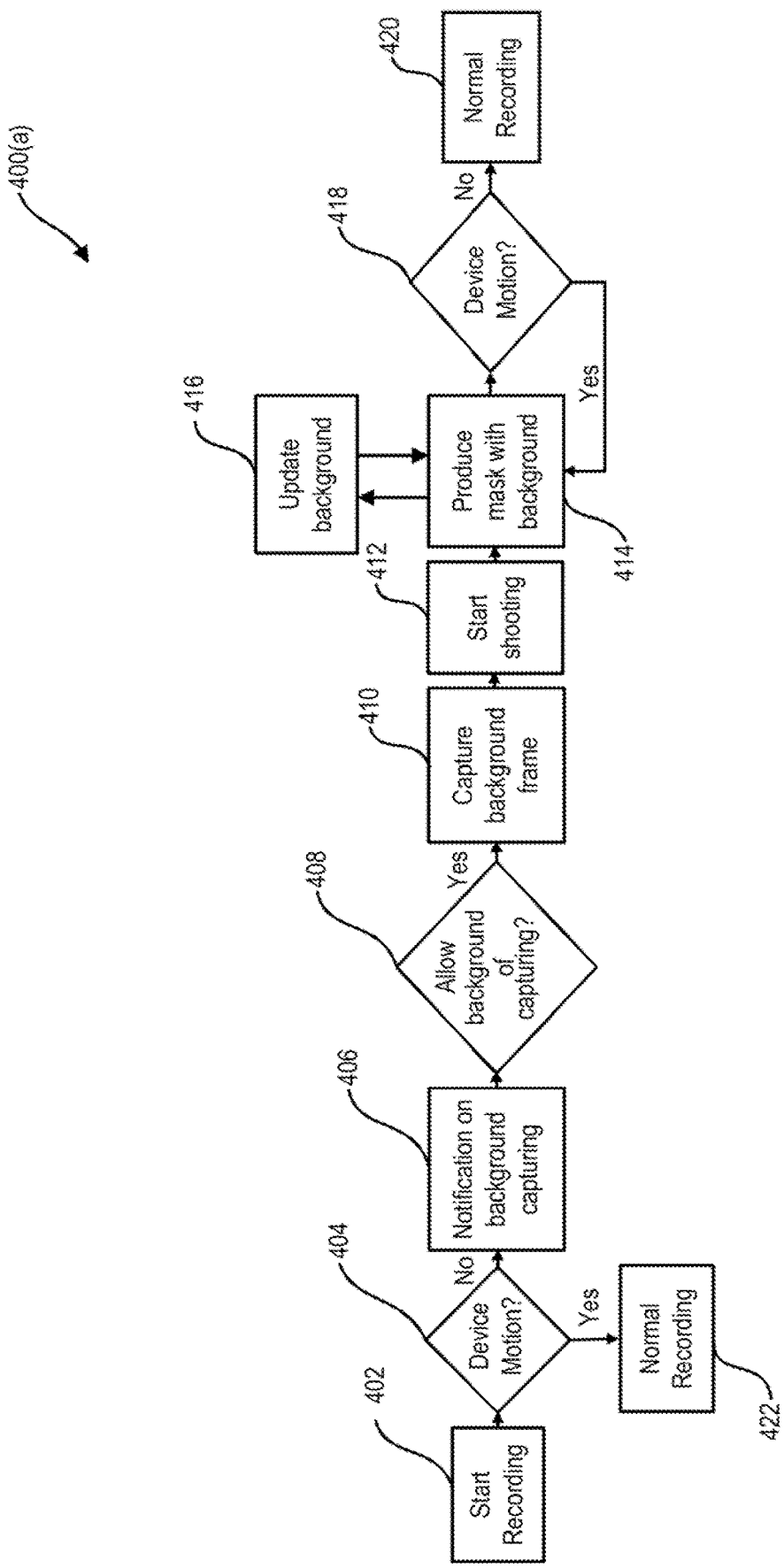
FIG. 4(A) illustrates a workflow diagram of the multi-modal system for segmenting a multimedia in the event of background capturing permitted in accordance with the present invention.

FIG. 4(A) illustrates a workflow of a video through a multi-modal system (400) to produce a segmented video in case if background capturing allowed. The multi-modal system (400) segments a multimedia to create a segmented multimedia. The multi-modal system (400) ensures that quality of the segmented multimedia is high. In an example, the multimedia may be a video, an image, an audio and the like. The multi-modal system provides seamless and high-quality user experience. The multi-modal system (400) represents dense and precise representation of one or more foreground objects. In an example, the one or more foreground objects may not be limited to humans and salient objects. The multi-modal system (400) segments the multimedia object to generate the segmented multimedia object.

The multi-modal system (100) initiates a recording of the multimedia using a multimedia unit. In an example, the multimedia object may not be limited to a video, an audio and the image. In another example, the multimedia unit may not be limited to a digital camera, a mobile phone, a camcorder, a tablet, a webcam, a laptop and an iPad.

The multi-modal system (400) detects motion of the multimedia unit (104) by a detecting unit (302). In addition, the detection unit (302) detects motion of the multimedia unit by utilizing one or more sensors. In an example, the one or more sensors may not be limited to accelerometer sensor, gyroscope sensor and GPS.

The multi-modal system (100) further sends notification to the multimedia unit (104) through a notification unit (106) in order to capture background details. The multi-modal system (100) utilizes the notification unit (106) to send notification related to capture the background details. In another embodiment, the background details are associated with the multimedia object.

The notification provided by the notification unit (118) to the multimedia unit (104) permits the capturing of the background details or region associated with the multimedia. The capturing unit (104) captures the background details. The multi-modal system (100) activates shooting mode by starting shooting by using the multimedia unit. In general, the shooting mode starts shooting of the multimedia along with the background region and background details.

The multi-modal system (100) includes a masking unit for producing multiple masks based on the background region and background details captured by the multimedia unit. The multiple masks are Artificial Intelligence masks. The multi-modal system (100) periodically updates the background details. The background details updated to ensure up-to-date status of the multimedia. The The multi-modal system (400) includes an analyzing unit that analyzes movement of the multimedia unit. In an example, the analyzing unit detects that the multimedia not in motion. The analyzing unit processes to normal recording.

Hence, the multi-modal system (400) segments the multimedia based on detection of motion of the multimedia unit by the detection unit (302), capturing of the background details of the multimedia object and the multiple masks produced by the mask production unit. The multi-modal system thereby generates a segmented multimedia with foreground object segmentation and continuous tracking of the recording as well as motion of the multi-media unit (104).

In an embodiment, the detection unit (302) detects motion of the multimedia unit. In an example, the multi-modal system (400) starts recording. In addition, the detection unit (402) associated with the multimedia unit of the Multi-modal system (400) detects motion. In addition, the detection unit (302) detects motion produced by the multimedia unit. Afterwards, the detection unit (302) sends signal to the Multi-modal system 100.

Further, the multi-modal system (400) terminates further step and starts normal recording. Further, the Multi-modal system (400) begins the normal recording of the multimedia object by the multimedia device.

Figure 4B:
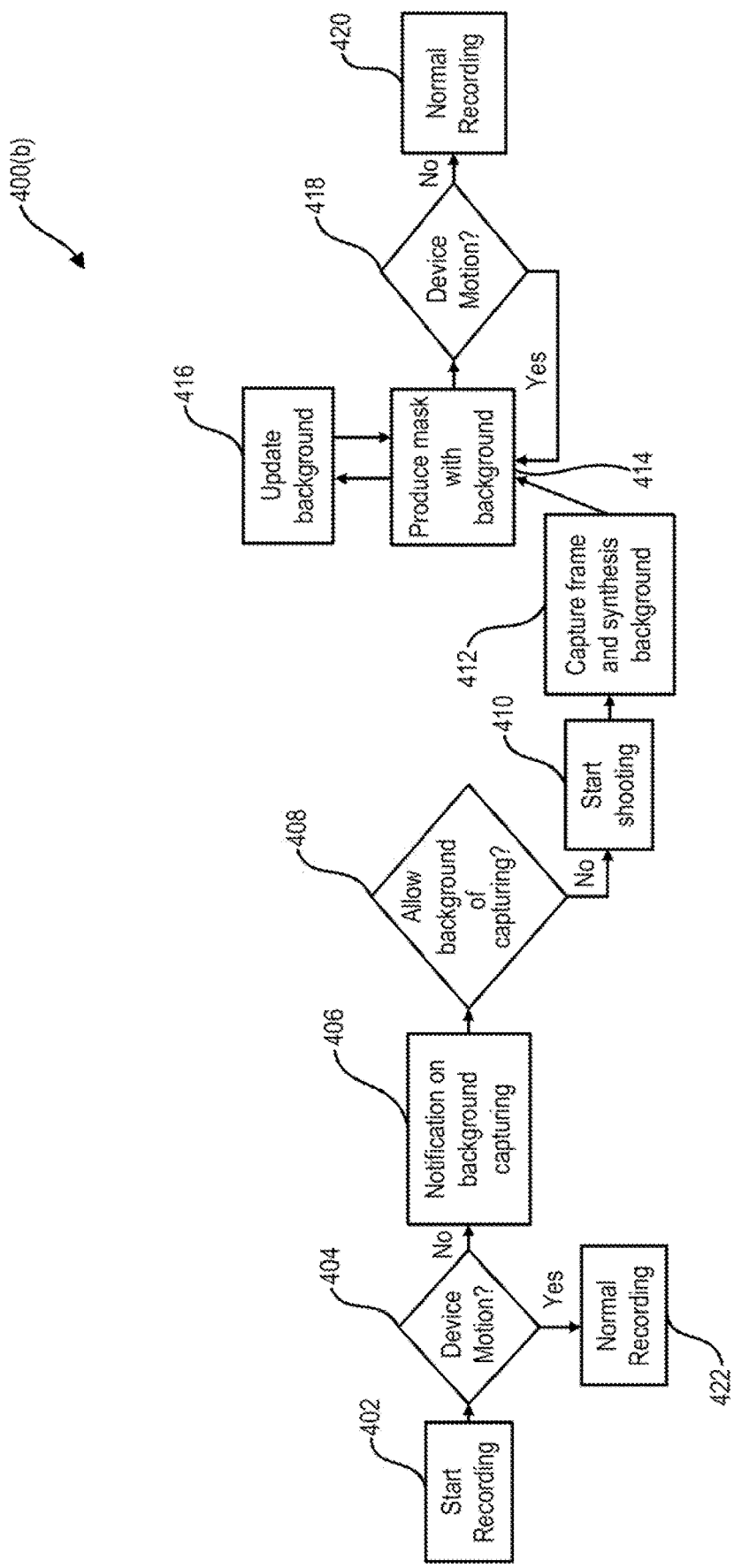
FIG. 4(B) illustrates a view of a workflow diagram of the multi-modal system for segmenting a multimedia in the event of background capturing refusal in accordance with the present invention.

FIG. 4(B) illustrates a workflow of a multimedia through a multi-modal system (400) to produce a segmented video in case if background capturing not allowed or refused. The multi-modal system (400) segments a multimedia to create a segmented multimedia. The multi-modal system (400) ensures that quality of the segmented multimedia is high. In an example, the multimedia may be a video, an image, an audio and the like. The multi-modal system provides seamless and high quality user experience. The multi-modal system (400) represents dense and precise representation of one or more foreground objects. In an example, the one or more foreground objects may not be limited to humans and salient objects. The multi-modal system (400) segments the multimedia object to generate the segmented multimedia object.

The multi-modal system (400) initiates a recording of the multimedia using a multimedia unit. In an example, the multimedia object may not be limited to a video, an audio and the image. In another example, the multimedia unit may not be limited to a digital camera, a mobile phone, a camcorder, a tablet, a webcam, a laptop and an iPad.

The multi-modal system (400) detects motion of the multimedia unit (104) by a detecting unit (302). In addition, the detection unit (302) detects motion of the multimedia unit by utilizing one or more sensors. In an example, the one or more sensors may not be limited to accelerometer sensor, gyroscope sensor and GPS.

The multi-modal system (400) further sends notification to the multimedia unit (104) through a notification unit (106) in order to capture background details. The multi-modal system (100) utilizes the notification unit (106) to send notification related to capture the background details. In another embodiment, the background details are associated with the multimedia object.

The notification provided by the notification unit (118) to the multimedia unit (104) refuses or disallow the capturing of the background details or region associated with the multimedia. The multi-modal system (400) activates shooting mode by starting shooting by using the multimedia unit. In general, the shooting mode starts shooting of the multimedia along with the background region and background details.

The capturing unit (104) captures the background details and region. Further, the background synthesis unit (120) starts synthesis of the background region along with the capturing of the background region and details.

The masking unit (114) for producing multiple masks based on the background region and background details captured by the multimedia unit (104). The multiple masks are artificial intelligence (AI) masks. The multi-modal system (400) periodically updates the background details. The background details updated to ensure up-to-date status of the multimedia.

The multi-modal system (400) includes an analyzing unit that analyzes movement of the multimedia unit. In an example, the analyzing unit detects that the multimedia not in motion. The analyzing unit processes to normal recording.

Hence, the multi-modal system (400) segments the multimedia based on detection of motion of the multimedia unit by the detection unit (302), capturing of the background details of the multimedia object and the multiple masks produced by the mask production unit. The multi-modal system thereby generates a segmented multimedia with foreground object segmentation and continuous tracking of the recording as well as motion of the multi-media unit (104).

In an embodiment, the detection unit (302) detects motion of the multimedia unit (104). In an example, the multi-modal system (400) starts recording. In addition, the detection unit (402) associated with the multimedia unit of the Multi-modal system (400) detects motion. In addition, the detection unit (302) detects motion produced by the multimedia (104). Afterwards, the detection unit (302) sends signal to the multi-modal system (400).

Further, the multi-modal system (400) terminates further step and starts normal recording. Further, the Multi-modal system (400) begins the normal recording of the multimedia object by the multimedia device.

Figure 5:
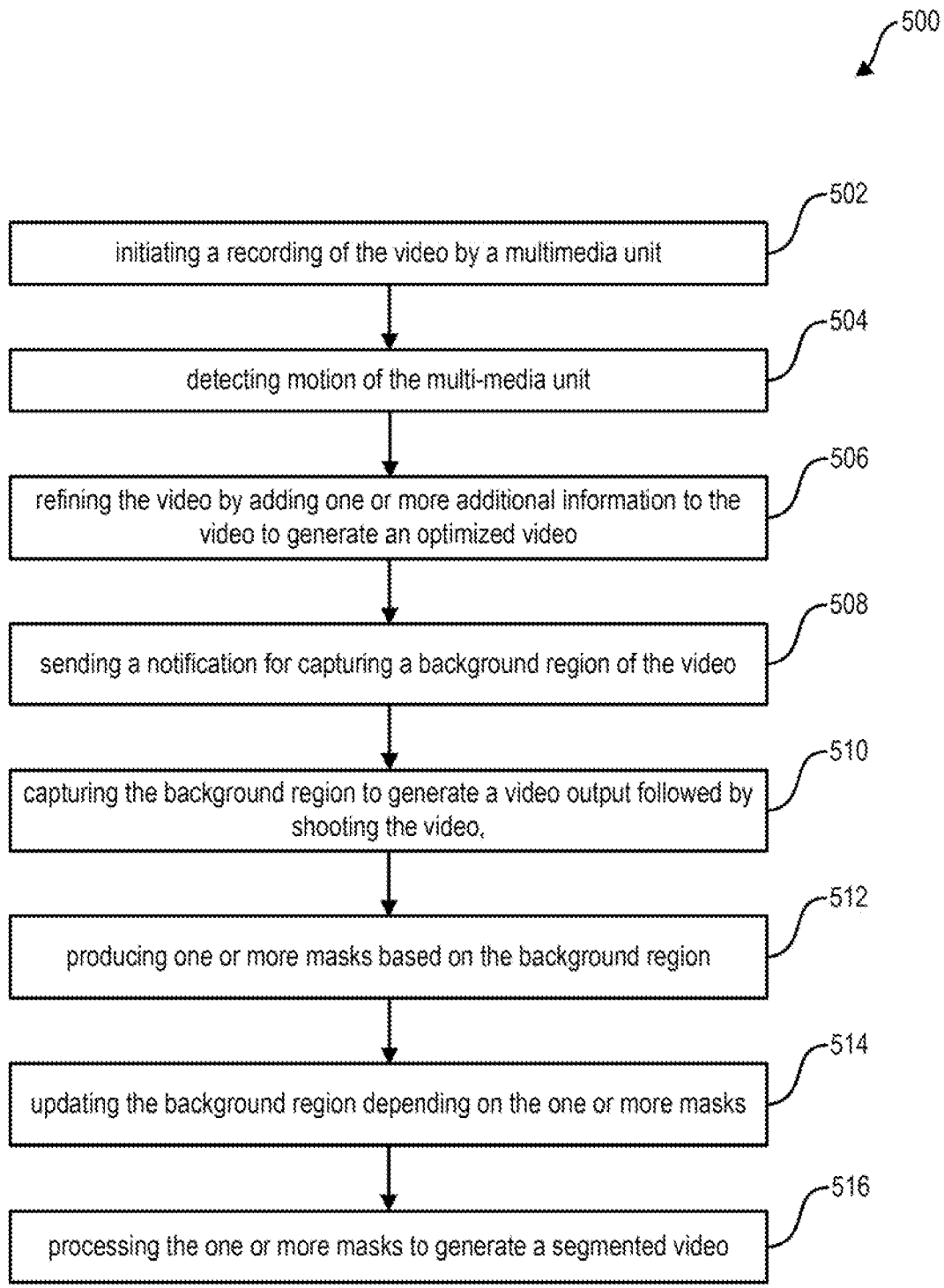
FIG. 5 illustrates a method for segmenting a video by using the multi-modal system in accordance with the present invention.

FIG. 5 illustrates a method (500) for segmenting a video by using a multi-modal system (100). At step 502, initially, the multi-modal system (100) initiates a recording of the video using a multimedia unit (104). In an example, the multimedia may not be limited to a video, an audio and the image. In another example, the multimedia unit may not be limited to a digital camera, a mobile phone, a camcorder, a tablet, a webcam, a laptop and an iPad.

Further, at step 504, a detecting unit (302) detects motion of the multimedia unit. The detection unit (302) detects motion of the multimedia unit (104) by utilizing sensors. In an example, the one or more sensors may not be limited to accelerometer sensor, gyroscope sensor and GPS.

Further, at step 506, a cascade refinement module (102) refines the video by adding information to the video to generate an optimized output. The refining unit (108) refines the video by adding information to the video to generate an optimized output.

Further, at step 506, a notification unit sends a notification in relation with the capturing of the background in order to capture background details or regions. The background details or region associated with the multimedia. The notification provided by the notification unit (106) to the multimedia unit (104) asks a user to allow to capture or record the background details associated with the multimedia.

Further, at step 508, capturing of the background details or regions starts by the capturing unit (112). The capturing captures frame. In an alternative embodiment, further, the multi-modal system (100) activates shooting mode of the multimedia unit. In general, the shooting mode starts shooting the video along with the capturing of the background details or regions.

Further, at step 510, producing multiple masks based on the frame and synthesis background details captured by the multimedia unit (104) by using a masking unit (114). The multiple masks are Artificial Intelligence masks.

Further, at step 512, processing the multiple masks produced to generate a segmented video.

Figure 6:
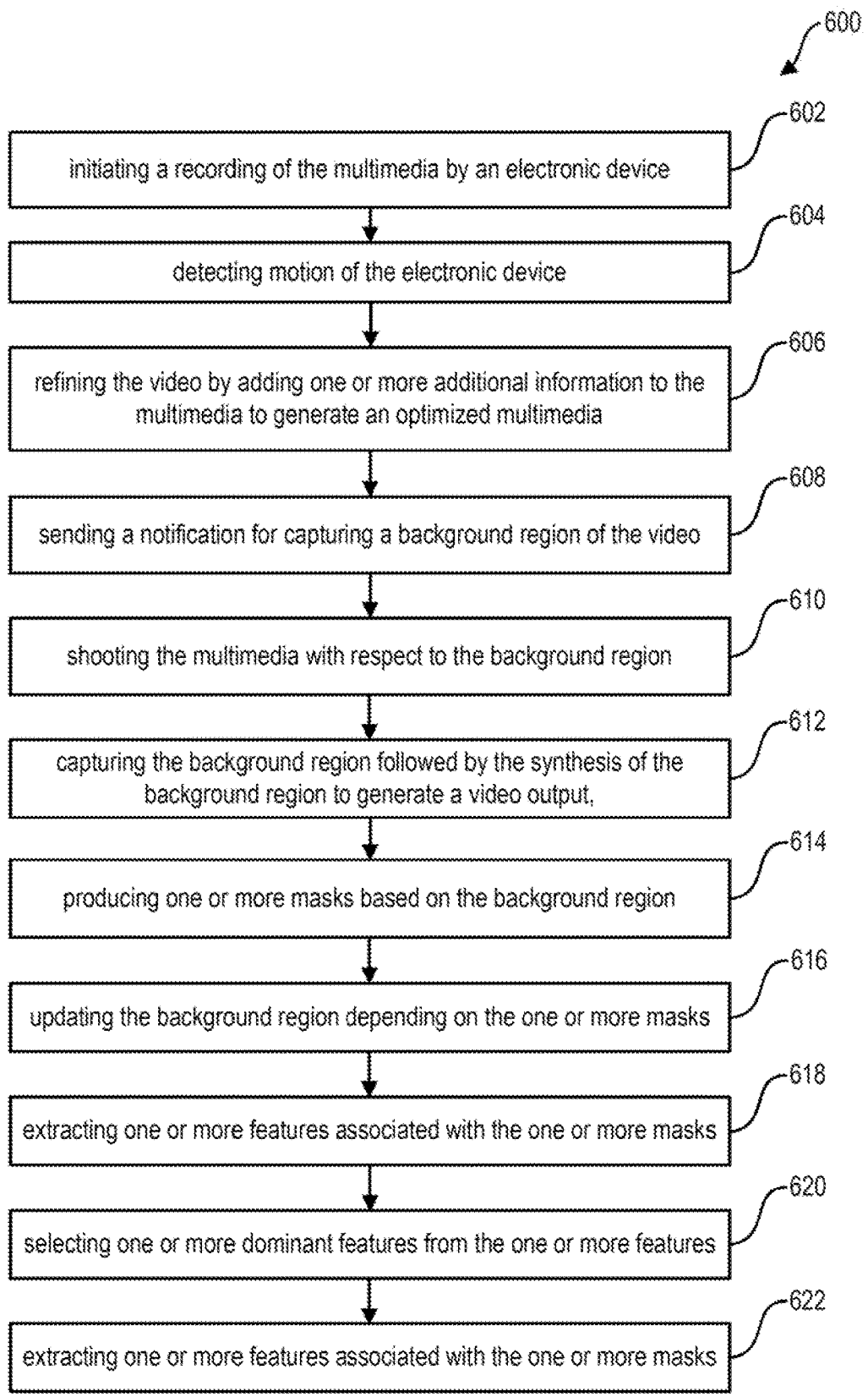
FIG. 6 illustrates a method for segmenting a multimedia by using the multi-modal system in accordance with the present invention.

FIG. 6 illustrates a method (600) for segmenting a video by using a multi-modal system (100). At step 602, initially, the multi-modal system (100) initiates a recording of the video using a multimedia unit (104). In an example, the multimedia may not be limited to a video, an audio and the image. In another example, the multimedia unit may not be limited to a digital camera, a mobile phone, a camcorder, a tablet, a webcam, a laptop and an iPad.

Further, at step 604, a detecting unit (302) detects motion of the multimedia unit. The detection unit (302) detects motion of the multimedia unit (104) by utilizing sensors. In an example, the one or more sensors may not be limited to accelerometer sensor, gyroscope sensor and GPS.

Further, at step 606, a cascade refinement module (102) refines the video by adding information to the video to generate an optimized output. The refining unit (108) refines the video by adding information to the video to generate an optimized output.

Further, at step 608, a notification unit (118) sends a notification in relation with the capturing of the background in order to capture background details or regions. The background details or region associated with the multimedia. The notification provided by the notification unit (106) to the multimedia unit (104) asks a user to allow to capture or record the background details associated with the multimedia.

Further, at step 610, activating shooting mode of the multimedia with respect to the capturing of the background details or regions Further, at step 612, capturing of the background details or regions starts by the capturing unit (112). In an alternative embodiment, further, the multi-modal system (100) synthesizes the background complementing the multimedia to generate the video output complemented with the synthesized background.

Further, at step 614, producing multiple masks based on the frame and synthesis background details captured by the multimedia unit (104) by using a masking unit (114). The multiple masks are Artificial Intelligence masks.

Further, at step 616, updating the background region depending on the one or more masks periodically.

Further, at step 618, extracting multiple features associated with the multiple masks by using a CNN extractor.

Further, at step 620, selecting dominant and effective features from the multiple features associated with the multiple masks.

Further at step 622, combining dominant and effective features to process the multimedia to produce a segmented multimedia. The segmented multimedia may be image, video or the like and applicable for video application such as virtual reality, live shows etc.

Although, the invention is described above in terms of various exemplary embodiments and implementations, it should be understood that the various features, aspects, and functionality described in multiple of the individual embodiments are not limited in their applicability to the particular embodiment with which they are described, but instead can be applied, alone or in various combinations, to multiple of the other embodiments of the invention, whether or not such embodiments are described and whether or not such features are presented as being a part of a described embodiment. Thus, the breadth and scope of the present invention should not be limited by any of the above-described exemplary embodiments.

Although, the invention is described above in terms of various exemplary embodiments and implementations, it should be understood that the various features, aspects, and functionality described in multiple of the individual embodiments are not limited in their applicability to the particular embodiment with which they are described, but instead can be applied, alone or in various combinations, to multiple of the other embodiments of the invention, whether or not such embodiments are described and whether or not such features are presented as being a part of a described embodiment. Thus, the breadth and scope of the present invention should not be limited by any of the above-described exemplary embodiments.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

The invention claimed is:

1. A multi-modal system for segmenting a multimedia, wherein the multi-modal system comprising:
   an electronic device for recording of a video multimedia;
   at least one sensor for detecting motion of the electronic device;
   a processor including;
   a refinement unit configured to concatenate one or More additional information to the multimedia to generate an optimized multimedia;
   a notification unit configured to send a notification for capturing a background region of the video multimedia;
   a shooting unit configured to shoot the multimedia with respect to the background region;
   a capturing unit configured to capture the background region followed by the synthesis of the background region to generate a multimedia output; and
   a masking unit configured to produce one or more masks based on the background region; and
   wherein the refinement unit
   updates the background region depending on the one or more masks;
   extras one or More features associated with the one Or more mask;
   selects one or more dominant features from the one or more features; and
   combines the one or more dominant features to generate a segmented multimedia.

2. The multi-modal system in accordance with claim 1, wherein the refinement unit segments a foreground region of the multimedia.

3. The multi-modal system in accordance with claim 1, wherein the notification unit sending the notification based on capturing of the background region of the multi media.

4. The multi-modal system in accordance with claim 3, wherein the notification is a refusal of the capturing of the background region.

5. The multi-modal system in accordance with claim 4, wherein the refusal of the capturing of the background region triggers a shooting unit followed by capturing and synthesis of the background region.

6. The multi-modal system ii accordance with claim 1, wherein the processor further includes a background synthesis module for synthesizing the background region and capturing of the background region by the capturing unit.

7. The multi-modal system in accordance with claim 1, wherein the notification permits capturing of the background region.

8. The multi-modal system in accordance with claim 7, wherein the notification triggers the capturing unit to capture the background region followed by shooting the multimedia by the shooting unit.

9. The multi-modal system in accordance with claim 1, wherein the one or more additional information is based on at least one of backgrounds, foreground humans, consistent frames, pixels, motion maps and semantic boundaries of the multimedia.

10. The multi-modal system in accordance with claim 1, wherein the one or more masks are artificial intelligence (AI) based masks.

11. The multi-modal system in accordance with claim 1, wherein the extracting one or more features uses a convolutional neural network feature extractor.

12. The multi-modal system in accordance with claim 11, wherein the selecting one or more dominant features is automatic.

13. The multi-modal system in accordance with claim 1, wherein the multimedia is either of a video, an audio, or an image.

14. A method for segmenting a multimedia using a multi-modal system, wherein the method comprising:
- initiating a recording of the multimedia by an electronic device;
- detecting motion of the electronic device;
- refining the multimedia by concatenating one or more additional information to the multimedia to generate an optimized multimedia;
- sending a notification for capturing a background region of the multimedia;
- shooting the multimedia with respect to the background region;
- capturing the background region followed by, the synthesis of the background region to generate a multimedia output,
- producing one Or more masks based on the background region;
- updating the background region depending on the one or more masks;
- extracting one or more features associated with the one or more masks;
- selecting one or more dominant features from the one or more features; and
- combining the one or more dominant features to produce a segmented multimedia.

15. A non-transitory computer program product comprising a non-transitory computer useable medium having computer program logic for enabling at least one processor in a computer system for segmenting a multimedia via a software platform, said computer program logic comprising:
- initiating a recording of the multimedia by an electronic device,
- detecting motion of the electronic device;
- refining the multimedia by concatenating one or more additional information to the multimedia to generate an optimized multimedia;
- sending a notification fix capturing a background region of the video multimedia;
- shooting the multimedia with respect to the background region;
- capturing the background region followed by the synthesis of the background region to generate a multimedia output,
- producing one or more masks based on the background region;
- updating the background wound region depending on the one or more masks;
- extracting one or more features associated with the one or more masks;
- selecting one or more dominant features from the one or more features; and
- combining the one or more dominant features to produce a segmented multimedia.

\* \* \* \* \*